United States Patent
Hawley

(10) Patent No.: US 10,688,983 B2
(45) Date of Patent: Jun. 23, 2020

(54) DECELERATION CONTROL WITH ELECTRIC MOTOR AND MULTISPEED AUTOMATIC TRANSMISSION

(71) Applicant: Toyota Motor Engineering & Manufacturing North America, Inc., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 296 days.

(21) Appl. No.: 15/669,878

(22) Filed: Aug. 4, 2017

(65) Prior Publication Data
US 2019/0039601 A1  Feb. 7, 2019

(51) Int. Cl.
| | |
|---|---|
| *B60W 20/40* | (2016.01) |
| *B60W 20/10* | (2016.01) |
| *B60W 10/08* | (2006.01) |
| *B60W 10/02* | (2006.01) |
| *B60W 30/18* | (2012.01) |
| *B60W 10/06* | (2006.01) |

(52) U.S. Cl.
CPC ............ *B60W 20/40* (2013.01); *B60W 10/02* (2013.01); *B60W 10/06* (2013.01); *B60W 10/08* (2013.01); *B60W 20/10* (2013.01); *B60W 30/18072* (2013.01); *B60W 30/18127* (2013.01); *B60W 2510/081* (2013.01); *B60W 2510/18* (2013.01); *B60W 2710/0666* (2013.01); *B60W 2710/083* (2013.01); *B60W 2710/10* (2013.01); *B60W 2720/10* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 5,713,425 A | 2/1998 | Buschhaus | |
| 5,921,883 A | 7/1999 | Bellinger | |
| 6,364,434 B1 | 4/2002 | Sway-Tin | |
| 7,331,899 B2 | 2/2008 | Ortmann | |
| 2008/0020895 A1* | 1/2008 | Frances | F16H 61/21 |
| | | | 477/80 |

(Continued)

*Primary Examiner* — Abdhesh K Jha
(74) *Attorney, Agent, or Firm* — Sheppard, Mullin, Richter & Hampton LLP; Hector A. Agdeppa; Daniel N. Yannuzzi

(57) ABSTRACT

Systems and methods negate the effects of increased motor speed by a hybrid electric vehicle during an engine-off, coasting condition. Upon determining that the hybrid electric vehicle is traveling at a relatively high speed, and is experiencing an engine-on, coasting condition, the hybrid electric vehicle is transitioned to an electric motor-only mode of operation. Negative motor torque is generated to decelerate the hybrid electric vehicle while it is coasting. To optimize conditions for regenerative braking, the hybrid electric vehicle may downshift to a lower gear, increasing electric motor speed. However, the amount of negative motor power that is generated by the downshift can result in an undesirable deceleration experience. This negative motor torque can be reduced based upon the torque multiplication factor at the lower gear to mimic negative torque at the wheels had the hybrid electric vehicle not downshifted to the lower gear.

12 Claims, 6 Drawing Sheets

(56) References Cited

U.S. PATENT DOCUMENTS

| | | | |
|---|---|---|---|
| 2009/0288895 A1* | 11/2009 | Klemen | B60K 6/365 |
| | | | 180/65.25 |
| 2015/0134159 A1 | 5/2015 | Johri | |
| 2015/0266383 A1 | 9/2015 | Kidston | |
| 2016/0082942 A1 | 3/2016 | Park | |
| 2016/0325728 A1 | 11/2016 | Yang | |

* cited by examiner

DECELERATION CONTROL WITH ELECTRIC MOTOR AND MULTISPEED AUTOMATIC TRANSMISSION

TECHNICAL FIELD

The present disclosure relates generally to controlling motor torque in a hybrid vehicle. In some embodiments, motor torque is manipulated during a coasting event after downshifting to provide a more natural feeling of deceleration while simultaneously achieving improved regenerative braking performance.

DESCRIPTION OF RELATED ART

Hybrid vehicles have become increasingly popular among consumers concerned with their environmental impact and with increasing fuel economy. Hybrid vehicles generally utilize an engine, e.g., an internal combustion engine, along with an electric motor, which can also operate as a generator to provide energy to a battery that powers the electric motor. Hybrid vehicles can use an engine clutch that connects/disconnects the engine to/from a drivetrain. The drivetrain can include the engine and electric motor, and an automatic transmission coupled to the electric motor for transmitting power from the engine, electric motor, or both.

A certain rate of deceleration, along with a certain feeling a driver may experience during deceleration can result when operating a hybrid vehicle in an engine-on and/or hybrid electric vehicle (HEV) mode due to engine braking torque. When operating the hybrid vehicle in an engine-off/electric vehicle (EV) mode, however, negative motor torque is used to generate a braking force in order to decelerate the hybrid vehicle. This can result in a faster deceleration rate that can feel unfamiliar and/or unnatural to drivers.

BRIEF SUMMARY OF THE DISCLOSURE

In accordance with one embodiment, a method comprises determining a vehicle is experiencing an engine-on, coast condition, and transitioning to a motor-only mode in which negative motor torque is generated. The method may further comprise determining a rate of deceleration in a current gear, and downshifting from the current gear to a lower gear. Moreover, the method may comprise decreasing the negative motor torque to a torque level resulting in a rate of deceleration matching the determined rate of deceleration at the previously current gear.

In some embodiments, the vehicle comprises a parallel hybrid electric vehicle comprising at least one electric motor operatively connected in parallel with an internal combustion engine in a power transmission path of the parallel hybrid electric vehicle.

In some embodiments, the method may further comprise disconnecting the internal combustion engine from the power transmission path just prior to or upon the transition to the motor-only mode.

In some embodiments, the engine-on mode comprises a hybrid electric vehicle mode in which the electric motor and the engine operate simultaneously to provide drive power to the vehicle.

In some embodiments, determining the vehicle is experiencing an engine-on, coast condition comprises determining whether an amount of accelerator operation is zero and determining whether an amount of brake operation is zero.

In some embodiments, determining the rate of deceleration in the current gear comprises calculating torque at one or more wheels of the vehicle based upon a first torque multiplication factor based upon a gear ratio of a transmission effectuating the downshifting associated with the current gear applied to the negative motor torque. In some embodiments, the method may further comprise calculating the torque level to which the negative motor torque is reduced based upon a second torque multiplication factor of the transmission associated with the lower gear.

In some embodiments, an amount of torque multiplication due to the first torque multiplication factor is smaller than an amount of torque multiplication due to the second torque multiplication factor.

In some embodiments, the method further comprises determining the lower gear for the downshifting based upon a speed of rotation of an electric motor of the vehicle at which electric motor loss and inverter loss is minimized in anticipation of the vehicle initiating a regenerative braking mode of operation.

In accordance with one embodiment, a hybrid electric vehicle comprises a power transmission path. The power transmission path may comprise an internal combustion engine, and an electric motor operatively connected in parallel to the internal combustion engine. The hybrid electric vehicle may further comprise a torque converter converting power generated from at least one of the internal combustion engine and the electric motor, and delivering the power to an automatic transmission driving one or more wheels of the hybrid vehicle. Moreover, the hybrid electric vehicle may comprise an electronic control unit adapted to adjust negative motor torque generated by the electric motor at a current gear. The adjustment may result from the automatic transmission downshifting from a previous gear such that a rate of deceleration in the current gear matches a rate of deceleration in the previous gear.

In some embodiments, the electronic control unit controls the internal combustion engine by stopping operation of the internal combustion engine prior to the automatic transmission downshifting upon detecting an engine-on, coasting condition.

In some embodiments, the electronic control unit further controls an internal combustion engine connecting and disconnecting clutch to disconnect the internal combustion engine from the power transmission path upon detecting the engine-on, coasting condition.

In some embodiments, the electronic control unit detects the engine-on coasting condition by receiving one or more sensor signals indicating that an accelerator and brakes of the hybrid electric vehicle are not being operated by a driver of the hybrid electric vehicle.

In some embodiments, the electronic control unit predicts the rate of deceleration in the previous gear by calculating predicted torque at the one or more wheels by multiplying the negative motor torque prior to adjustment with a torque multiplication factor of the automatic transmission associated with the previous gear. In some embodiments, the electronic control unit determines an amount by which the negative motor torque is adjusted by determining an amount of negative motor torque that when multiplied by a torque multiplication factor of the automatic transmission associated with the current gear matches the predicted torque at the one or more wheels in the previous gear.

In some embodiments, the torque multiplication factor associated with the current gear is greater than the torque multiplication factor associated with the previous gear.

In some embodiments, the electronic control unit selects the current gear based upon a speed of rotation of the electric motor at the current gear that minimizes electric motor loss and inverter loss in anticipation of the hybrid electric vehicle entering a regenerative braking mode of operation.

In some embodiments, the speed of rotation of the electric motor is between approximately 1500 rpm and approximately 3000 rpm.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments of the present disclosure are directed to controlling motor torque in a hybrid vehicle when the hybrid vehicle is coasting in an engine-off/EV mode. As described above, negative motor torque can be used to generate a braking force in order to decelerate the hybrid vehicle. This negative motor torque can be used to charge the hybrid vehicle's battery, referred to as, e.g., regenerative braking torque. Thus, various embodiments of the present disclosure control motor speed to optimize conditions for regenerative braking. Motor loss is greater at relatively lower motor speeds, e.g., less than approximately 1600 rpms. Inverter loss is greater at relatively higher motor speeds, e.g., greater than approximately 4000 rpms. Accordingly, in some embodiments, a motor speed range between approximately 1500-3000 rpms can be maintained. Typically, the automatic transmission of the hybrid vehicle is made to downshift from a current gear to a lower gear, thereby increasing motor speed until it reaches a speed within the desired motor speed range.

In order to preserve the feeling of engine-on/HEV deceleration while also increasing motor speed, the amount of negative motor torque generated by the motor is reduced. The amount by which the negative motor torque is reduced results in torque at the wheels of the hybrid vehicle (after undergoing torque multiplication) that matches the torque at the wheels had the hybrid vehicle remained in its previous gear. In this way, the expected rate and feeling of deceleration can be maintained.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 1A:
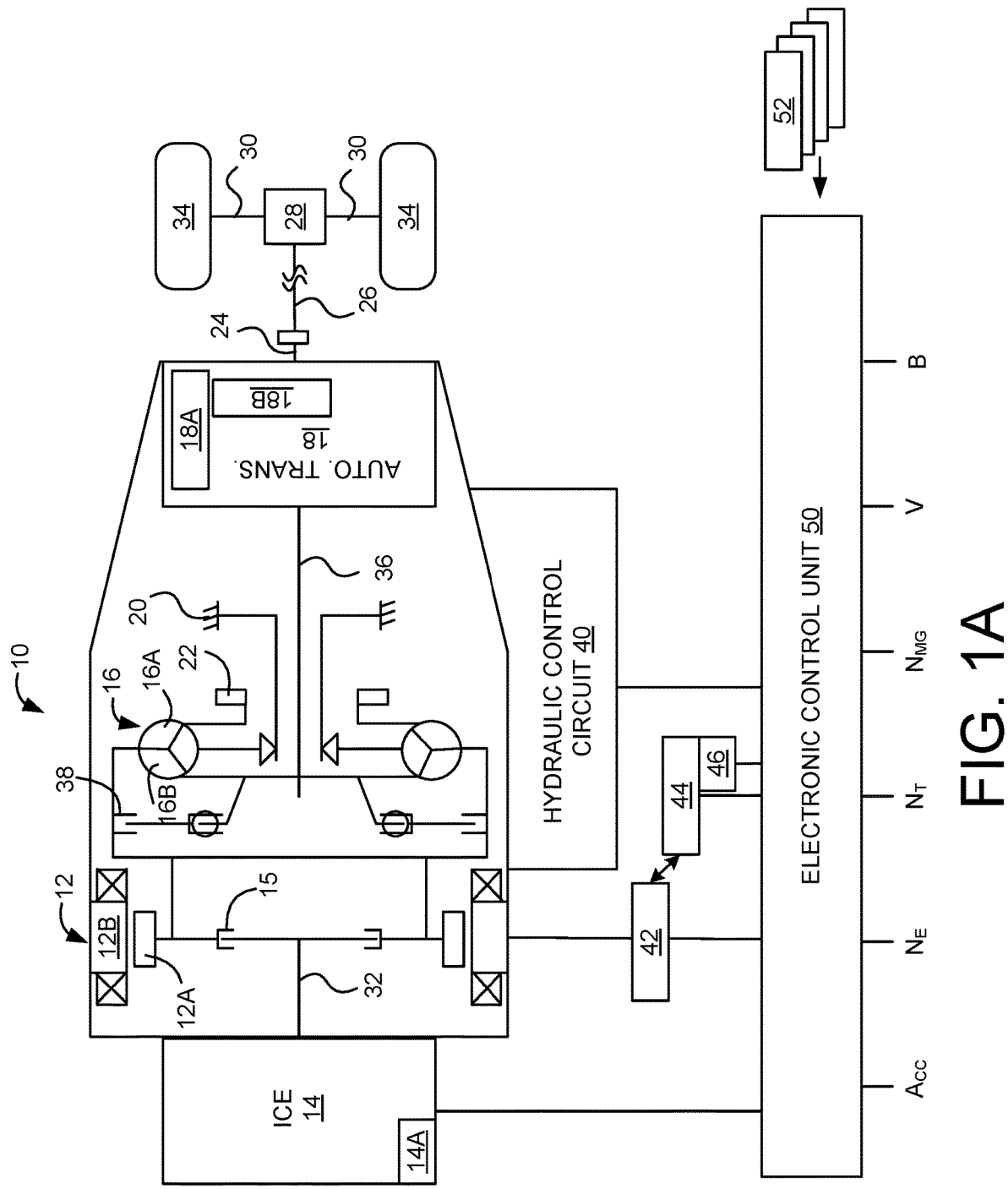
FIG. 1A is a schematic representation of a hybrid vehicle in which launch torque control can be implemented in accordance with various embodiments of the present disclosure.

FIG. 1A is a schematic representation of an example hybrid vehicle 10 in which motor torque control in accordance with various embodiments may be implemented. It should be noted that for clarity of the illustration, not all elements of hybrid vehicle 10 are labeled with a reference numeral. For example, in some cases, only one of two or more elements or components of hybrid vehicle 10 are labeled with a reference numeral. However, it can be assumed that the functionality and/or operation of similarly-illustrated elements or components are the same or substantially similar, unless described otherwise. Moreover, aspects of hybrid vehicle 10 may be described from the perspective of one/one set of elements or components. It can be assumed that secondary instances of those elements or components may operate the same or in a similar manner. It should also be noted that for ease of description and clarity of figures, not all components of a hybrid vehicle have been illustrated, and that the figures and corresponding descriptions are not meant to be limiting. It should be further noted that a hybrid vehicle may embody certain variations with respect to its elements or components, which are contemplated herein. For example hybrid vehicle 10 may be configured with only a single motor.

FIG. 1A includes an example drive system of a hybrid vehicle 10 that may include an engine 14 and a motor 12 as drive sources. Driving force generated by the engine 14 and the motor 12 can be transmitted to a pair of left and right driving wheels 34 via a torque converter 16, an automatic transmission 18, a differential gear device 28, and a pair of left and right axles 30. Each of the motor 12, the torque converter 16, and the automatic transmission 18 can be housed in a transmission case 20. The transmission case 20 may be a splittable case made of aluminum die cast parts, for example, and fixed to a non-rotating member such as a vehicle body.

Hybrid vehicle 10 may be driven/powered with at least one of the engine 14 and the motor 12 as the drive source for travel. In other words, any one of a plurality of travel modes can be selectively established in the hybrid vehicle 10. A first travel mode may be an engine-only travel mode that only uses the engine 14 as the drive source for travel. A second travel mode may be an EV travel mode that only uses the motor 12 as the drive source for travel. A third travel mode may be an HEV hybrid travel mode that uses the engine 15 and the motor 12 as drive sources for travel. In the engine-only and HEV travel modes, hybrid vehicle 10 travels by using the driving force generated at least by engine 14 while a clutch 15 is engaged. In EV travel mode, hybrid vehicle 10 travels by using the driving force generated by motor 12 while the engine 14 is stopped and clutch 15 is disengaged.

Engine 14 can be an internal combustion engine such as a gasoline engine or a diesel engine of an in-cylinder injection type, where fuel is injected directly into a combustion chamber. An output control device 14A is provided to control drive (output torque) of the engine 14. The output control device 14A includes a throttle actuator that controls opening and closing of an electronic throttle valve, a fuel injection device that controls fuel injection, an ignition device that controls ignition timing, and the like. The output control device 14A executes output control of engine 14 according to a command supplied from an electronic control unit 50 described below. Such output control can include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A lock-up clutch 38 that directly connects a pump impeller 16A and a turbine 16B so that they can integrally rotate is provided between pump impeller 16A and the turbine 16B of torque converter 16. The lock-up clutch 38 can be controlled such that its engagement state becomes any one of engagement (complete engagement), slip engagement, and disengagement (complete disengagement) according to hydraulic pressure supplied from a hydraulic control circuit 40. A mechanical hydraulic pump 22 is coupled to the pump impeller 16A of the torque converter 16, and hydraulic pressure generated by hydraulic pump 20 is supplied to hydraulic control circuit 40 as source pressure along with rotation of the pump impeller 16A. Turbine 16B may be coupled to a transmission input shaft 36 that transfers power from motor 12 and/or engine 14 to automatic transmission 18 to which a transmission output shaft 24 is attached. Connected to transmission output shaft 24 is a propeller shaft 26 coupled to differential gear device 28.

Automatic transmission 18 can be a stepped transmission mechanism that selectively establishes any of a plurality of predetermined gears (gear ratios), for example, and is configured to include a plurality of engagement elements to perform such gear ratio changes. Automatic transmission 18 can include a plurality of hydraulic frictional engagement devices, such as multiple disc clutches 18B and brakes 18A whose engagement is controlled by a hydraulic actuator. These hydraulic frictional engagement devices are selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) can be selectively established according to a combination of coupling states of the hydraulic frictional engagement devices. For example, the coupling states of the hydraulic frictional engagement devices can allow for upshifting and downshifting between the forward and reverse gears.

Motor 12 may include a rotor 12A and a stator 12B. Rotor 12A can be rotatably supported around an axis by the transmission case 20. Stator 12B can be integrally fixed to the transmission case 20 on an outer peripheral side of the rotor 12A. Motor 12 can be a motor generator that functions as a motor that generates driving force and a generator that generates reaction force. The motor 12 may be connected to a power storage device, such as a battery 44 and a capacitor via an inverter 42. The electronic control unit 50 described below controls inverter 42, adjusts driving current supplied to coils of the motor 12, and controls driving of the motor 12. That is, output torque of the motor 12 can be increased or decreased by electronic control unit 50 through the inverter 42.

In a power transmission path between engine 14 and motor 12, clutch 15 controls power transmission in the power transmission path according to an engagement state. That is, a crankshaft 32 that is an output member of the engine 14 is selectively coupled to the rotor 12A of the motor 12 via clutch 15. Rotor 30 of the motor MG is coupled to a front cover that is an input member of the torque converter 16. Clutch 15 is, for example, a multiple disc type hydraulic frictional engagement device whose engagement is controlled by a hydraulic actuator. Clutch 15 is controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 is controlled according to the hydraulic pressure supplied from the hydraulic control circuit 40. When clutch 15 is engaged, and power transmission is provided in the power transmission path between the crankshaft 32 and the front cover of the torque converter 16. On the other hand, when clutch 15 is disengaged, power transmission is blocked from being delivered to the power transmission path between the crankshaft 32 and the front cover of the torque converter 16. In a slip engagement state or mode, clutch 15 is engaged, and power transmission according to a torque capacity (transmission torque) of the clutch 15 is provided to the power transmission path between the crankshaft 32 and the front cover of the torque converter 16.

Hybrid vehicle 10 may include an electronic control unit 50. Electronic control unit 50 may include a microcomputer that includes a CPU, a RAM, a ROM, an input-output interface, and the like. In electronic control unit 50, the CPU utilizes a temporary storage function of the RAM to perform signal processing according to a program in advance stored in the ROM. Accordingly, the electronic control unit 50 executes various kinds of control such as drive control of the engine 14, drive control of the motor 12, speed change control of the automatic transmission 18, engagement force control of the clutch 15, engagement control of the lock-up clutch 38, and the like. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the hybrid vehicle 10.

As shown in FIG. 1A, the electronic control unit 50 is supplied with various kinds of input signals detected by each sensor provided in the hybrid vehicle 10. For example, electronic control unit 50 may receive signals that indicate an accelerator operation amount $A_{CC}$, a revolution speed $N_E$ of the engine 14 (engine revolution speed), a rotational speed $N_T$ of the turbine 16B (turbine rotational speed), a rotational speed $N_{MG}$ of the motor 12 (motor rotational speed), a vehicle speed V, and power storage amount (remaining capacity, charged amount), e.g., battery SOC of battery 44. It should be noted that more signals indicative of other operational aspects of hybrid vehicle 10 can be received by electronic control unit 50, e.g., a temperature of motor 12, coolant temperature of hybrid vehicle 10, intake air amount of engine 14, etc.

Electronic control unit 50 can receive the input signals from various sensors 52 configured to sense relevant operational characteristics of hybrid vehicle 10. For example, accelerator operation amount $A_{CC}$ can be detected by an accelerator operation amount sensor that determines the degree to which an accelerator pedal is depressed/actuated. For example, brake operation amount B can be detected by a foot brake sensor. For example, engine revolution speed $N_E$ can be detected by an engine revolution speed sensor. The turbine rotational speed $N_T$ can be detected by a turbine rotational speed sensor. The motor rotational speed $N_{MG}$ can be detected by a motor rotational speed sensor. Vehicle speed V can be detected by a vehicle speed sensor. Battery SOC can be detected by an SOC sensor 46.

Electronic control unit 50 can supply various output signals to one or more devices/components/elements provided in hybrid vehicle 10. For example, the electronic control unit 50 can supply signals to output control device 14A of the engine 14 to effectuate drive control of the engine 14. Electronic control unit 50 can supply signals to inverter 42 for effectuating drive control of the motor 12. Electronic control unit 50 can supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15. Electronic control unit 50 can also supply signals to the linear solenoid valve in the hydraulic control circuit 40 for engagement control of the lock-up clutch 38, line pressure control, and the like.

Figure 1B:
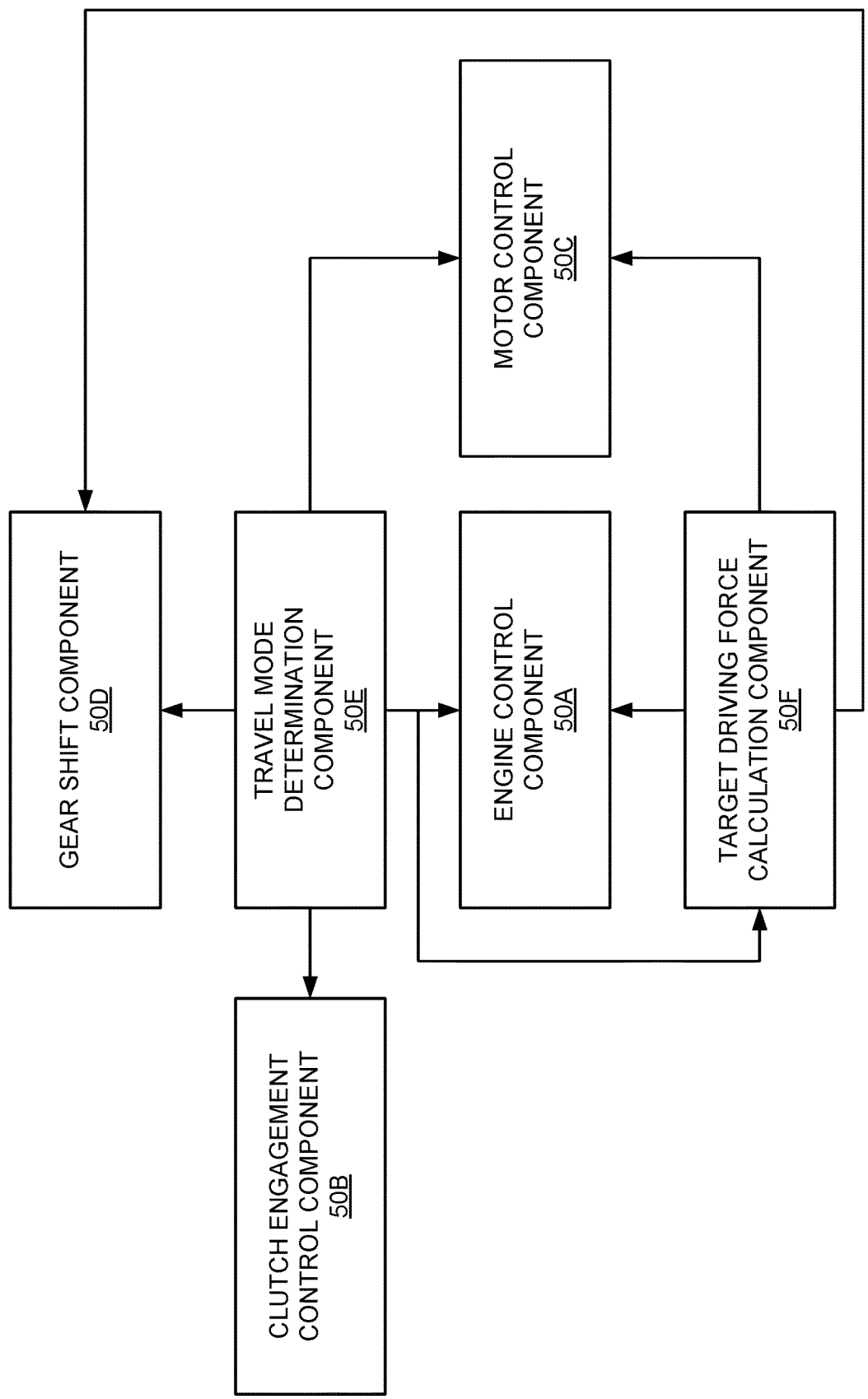
FIG. 1B is a functional block diagram illustrates component parts of a control function included in an electronic control unit of the hybrid vehicle illustrated in FIG. 1A.

FIG. 1B is a functional block diagram that illustrates example parts of a control function included in the electronic control unit 50, and will be described in conjunction with FIG. 2, a flow chart illustrating example operations that can be performed to achieve desired deceleration. An engine control component 50A shown in FIG. 1B controls the drive (output torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required by engine 14 can be achieved.

Engine control component 50A drives engine 14 in the engine-only and HEV travel modes. For example, engine control component 50A may control when engine 14 is started, e.g., when switching from EV travel mode to the engine-only travel mode or the HEV travel mode. Likewise, engine control component 50A may control when engine 14 is shut off, e.g., when switching from engine-only or HEV travel mode to EV travel mode. This can occur when hybrid vehicle 10 is coasting, e.g., prior to effectuating motor torque control for achieving desired deceleration rate(s) and driver experience, described below.

To control engine 14, clutch 15 may be engaged (slip or complete engagement) so as to connect engine 14 to the power transmission path. This can be accomplished by clutch engagement control component 50B, described below. Engine control component 50A can instruct engine 14 to revolve resulting in an engine revolution speed $N_E$, and the supply of fuel to engine 14 is started via the output control device 14A.

When hybrid vehicle 10 is to be operated in EV mode, as can be done during implementation of motor torque control in accordance with various embodiments, engine control component 50A outputs a control signal(s) to output control device 14A for stopping engine 14. Clutch 15 may be disengaged, and engine 14 is stopped.

As alluded to previously, clutch engagement control component 50B performs engagement control of the clutch 15 via the linear solenoid valve included in the hydraulic control circuit 40 by controlling current supplied to the linear solenoid valve. The hydraulic pressure supplied from the linear solenoid valve to the hydraulic actuator included in the clutch 15 as a result of the supplied current effectuates engagement/disengagement of the clutch 15.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, upon determining that hybrid vehicle 10 is coasting in an EV travel mode, and after a downshift in gears, motor control component 50C outputs a control signal(s) instructing inverter 42 to switch phase and change the direction of the magnetic field applied to motor 12. This generates negative motor torque that resists the forward momentum of hybrid vehicle 10 so that hybrid vehicle 10 decelerates. Moreover, motor control component 50C may output a control signal(s) instruction motor 12 to reduce the amount of negative motor torque it is generating for the given speed at which motor 12 is rotating, e.g., by controlling slip engagement of lock-up clutch 38.

As alluded to above, in order to optimize conditions for regenerative braking, hybrid vehicle 10 may be downshifted to achieve greater motor speed. A gear shift component 50D can output a control signal(s) instructing engagement/disengagement of one or more hydraulic frictional engagement devices through hydraulic control circuit 40 to effectuate a downshift to a lower gear ratio from a current gear ratio. The downshift can be initiated by a control signal(s) from a travel mode determination component 50E, described below.

A travel mode determination component 50E can make determinations regarding a travel mode established in hybrid vehicle 10 or on the basis of a target driving force, described below. A determination can be made regarding which travel mode (EV, engine-only, HEV) hybrid vehicle is in on the basis of, e.g., vehicle speed V, accelerator operation amount $A_{cc}$, battery SOC of battery 44, brake operation amount B, etc. For example, if the battery SOC of battery 44 indicates a low state of charge, travel mode determination component 50E may determine a need to switch from an EV/HEV travel mode to an engine-only travel mode.

Figure 2:
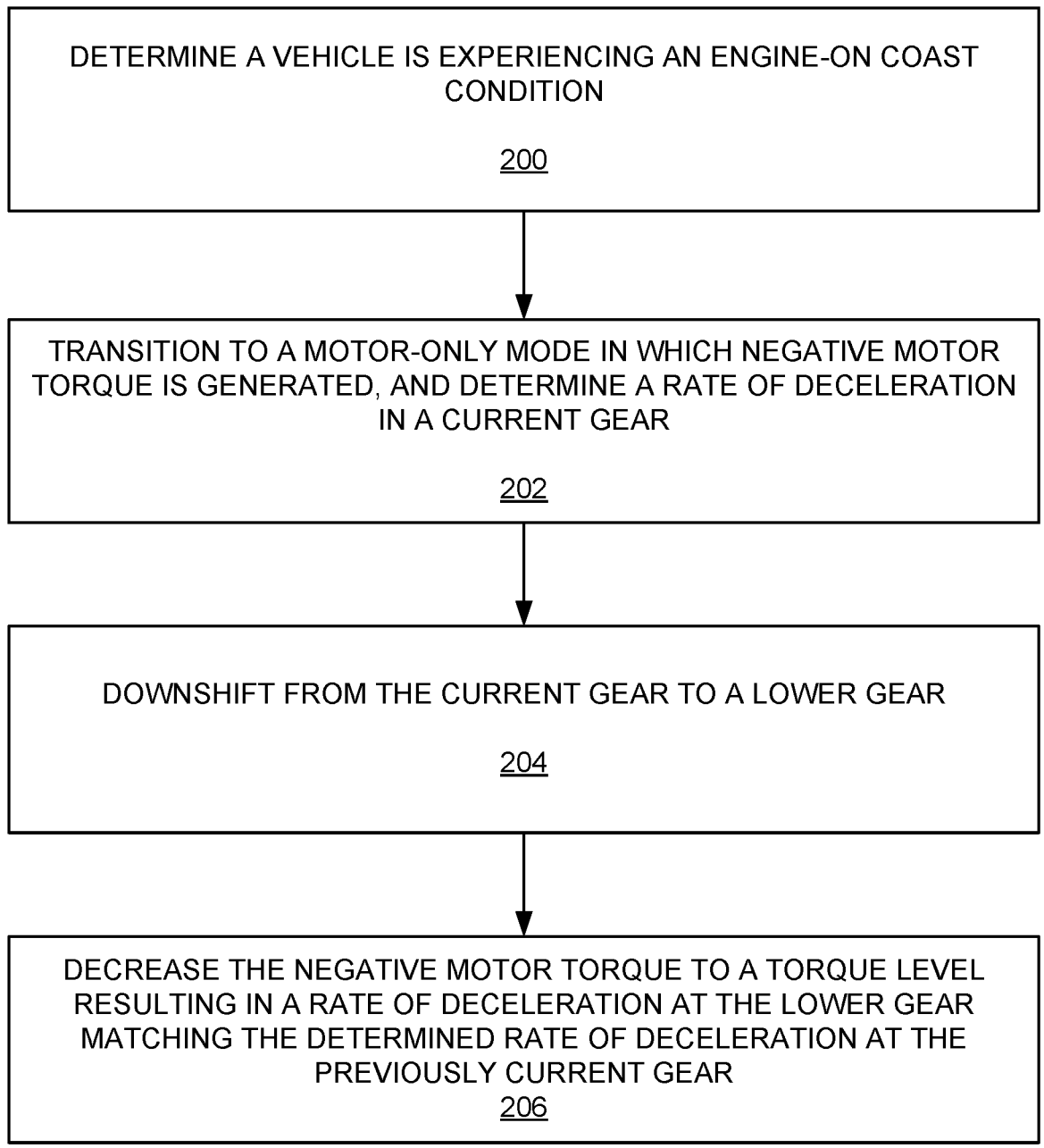
FIG. 2 is a flow chart illustrating example operations that can be performed to control motor torque in accordance with various embodiments of the present disclosure.

Referring now to FIG. 2, at operation 200, a determination can be made regarding whether a vehicle is experiencing an engine-on, coast condition. For example, travel mode determination component 50E may determine that hybrid vehicle 10 switches from an engine-on (engine-only or HEV) to an EV travel mode, and determines hybrid vehicle 10 is coasting. That is, travel mode determination component 50E can determine that the brakes and accelerator of hybrid vehicle 10 are released or in zero-state, and no drive power is being transmitted through the power transmission path of hybrid vehicle 10.

Referring back to FIG. 2, at operation 202, the vehicle is transitioned to a motor-only mode in which negative motor torque is generated, and a rate of deceleration in a current gear can be determined. The rate of deceleration can be determined based upon torque at wheels 34 of hybrid 10 using a target driving force calculation component 50F, described below.

Target driving force calculation component 50F can calculate a target driving force on the basis of a vehicle state. For example, the target driving force calculation component 50F can deduce (calculate) a target driving force that is a target value of the driving force to be transmitted to wheels 34, e.g., on the basis of a detected accelerator operation amount $A_{CC}$, detected vehicle speed V, and the like. Target driving force calculation component 50F may output control signals to one or more of engine control component 50A and motor control component 50C to control the drive of engine 14 and the action of motor 12 to achieve the target driving force. In the engine travel mode, the engine control component 50A controls the drive of the engine 12 with the target driving force calculated by the target driving force calculation component 88 as the target engine output.

That is, target driving force calculation component 50F can output a control signal(s) to engine control component 50A to stop engine 14. It should be noted that hybrid vehicles may be required to inject negative motor torque in a coasting condition when operating in an EV travel mode. In some embodiments, the motor generates the same level of negative torque that is produced when the engine is in a fuel-cut mode. In some embodiments, the motor torque may be set to 0 Nm causing no negative torque on the driveline. This results in the vehicle "sailing," whereby deceleration is caused by the rolling resistance and aero resistance on vehicle. Thus, target driving force calculation component 50F can calculate an amount of negative target driving force, and output a control signal(s) to motor 12 instructing it to operate accordingly. Moreover, travel mode determination component 50E, upon determining that hybrid vehicle 10 is an EV travel mode, may output a control signal(s) to clutch engagement control component 50B to disengage clutch 15, disconnecting engine 14 from the power transmission path.

In accordance with various embodiments, target driving force calculation component 50F can determine a rate of deceleration at the applicable gear ratio prior to downshifting, which can be a function of the negative motor torque at wheels 34. That is, given a current gear and the torque multiplication factor of torque converter 16 applicable at the current gear, the amount of torque at wheels 34 can be determined. The negative torque at wheels 34 and the vehicle speed V of hybrid vehicle 10 are indicative of a desired deceleration rate, i.e., one in which a driver of hybrid vehicle 10 would have experienced had hybrid vehicle 10 not downshifted into a lower gear, further described below. It should be noted that the desired deceleration rate may be considered to be a predictive or expected deceleration rate because the desired deceleration rate does not actually occur due to the downshift in gear.

Referring back to FIG. 2, at operation 204, the vehicle downshifts from the current gear into a lower gear. Target driving force calculation component 50F can output a control signal(s) to gear shift component 50D to downshift from a current gear. As described above, a gear to which automatic transmission 18 downshifts can be based upon a desired motor speed for optimizing regenerative braking conditions. Accordingly, target driving force calculation component 50F may receive an indication of the current operating gear from one of sensors 52 (or by monitoring automatic transmission 18), and a current motor 12/turbine 16B speed. A target motor 12/turbine 16B speed after downshifting can be calculated based on an algorithmic specification of target speed or by accessing/being provided with a target speed, e.g., from a lookup table or other form of datastore. Based on the target speed, an appropriate gear allowing that target speed to be reached can be selected. Target driving force calculation component 50F can output a control signal(s) to gear shift component 50D to complete the appropriate downshift based on this determination.

Referring back to FIG. 2, at operation 206, the negative motor torque is decreased to a torque level resulting in a rate of deceleration at the lower gear matching the determined rate of deceleration at the previously current gear. That is, once the downshift is completed at automatic transmission 18, target driving force calculation component 50F can output a control signal(s) to motor control component 50C. The control signal(s) can instruct motor control component 50C to reduce the amount of negative motor torque produced by motor 12.

The amount by which the negative motor torque is reduced can be calculated by target driving force calculation component 50F. In particular, target driving force calculation component 50F can calculate a predicted amount of negative motor torque that would be needed to match the previously-calculated torque at wheels 34 given the downshifted gear and relevant torque multiplication factor at that downshifted gear. Target driving force calculation component 50F can output a control signal(s) to motor control component 50C to adjust its current, negative motor torque output to correspond with the calculated amount of negative motor torque needed.

Figure 3A:
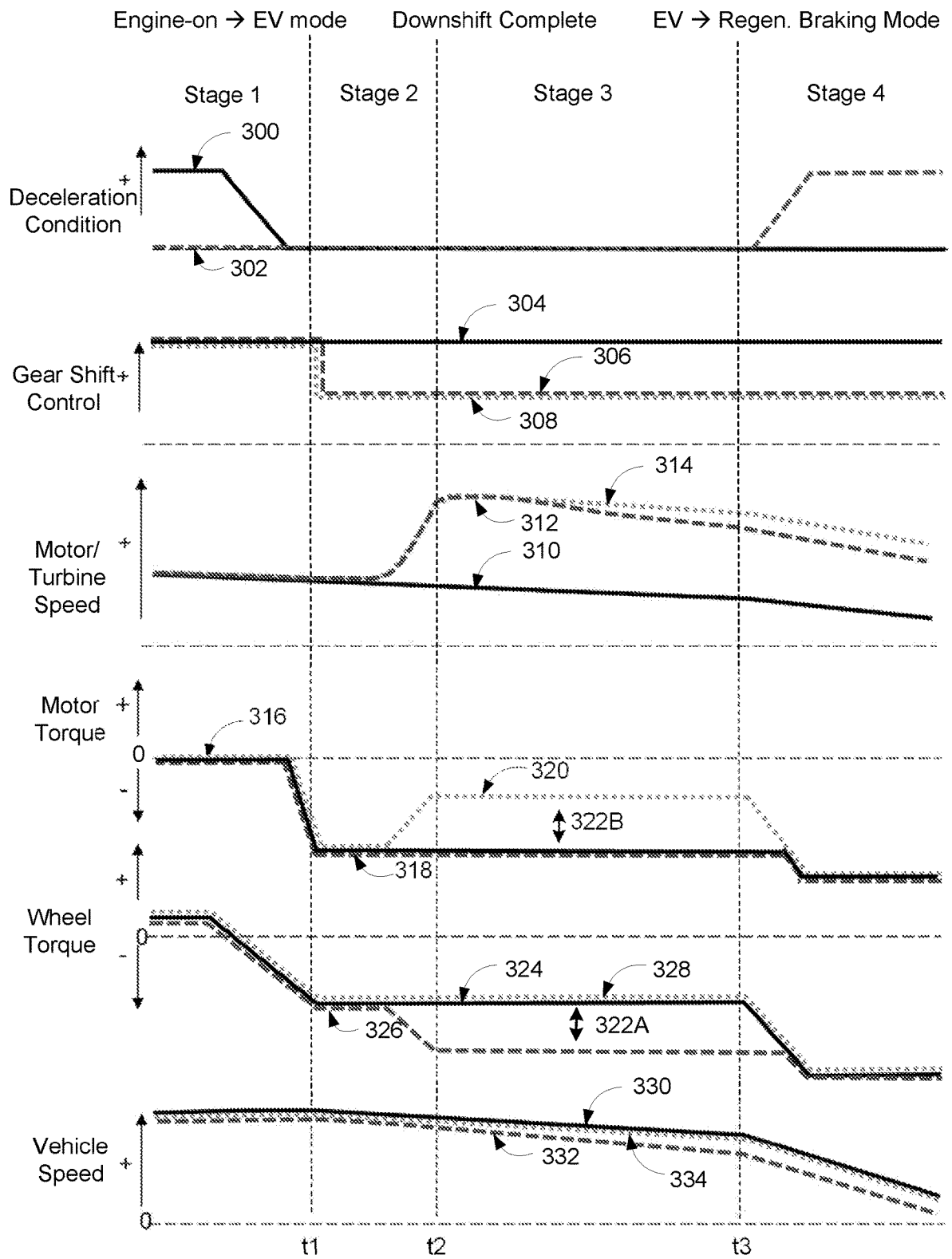
FIG. 3A is a time chart illustrating an example of motor torque control in accordance with various embodiments of the present disclosure.
Figure 3B:
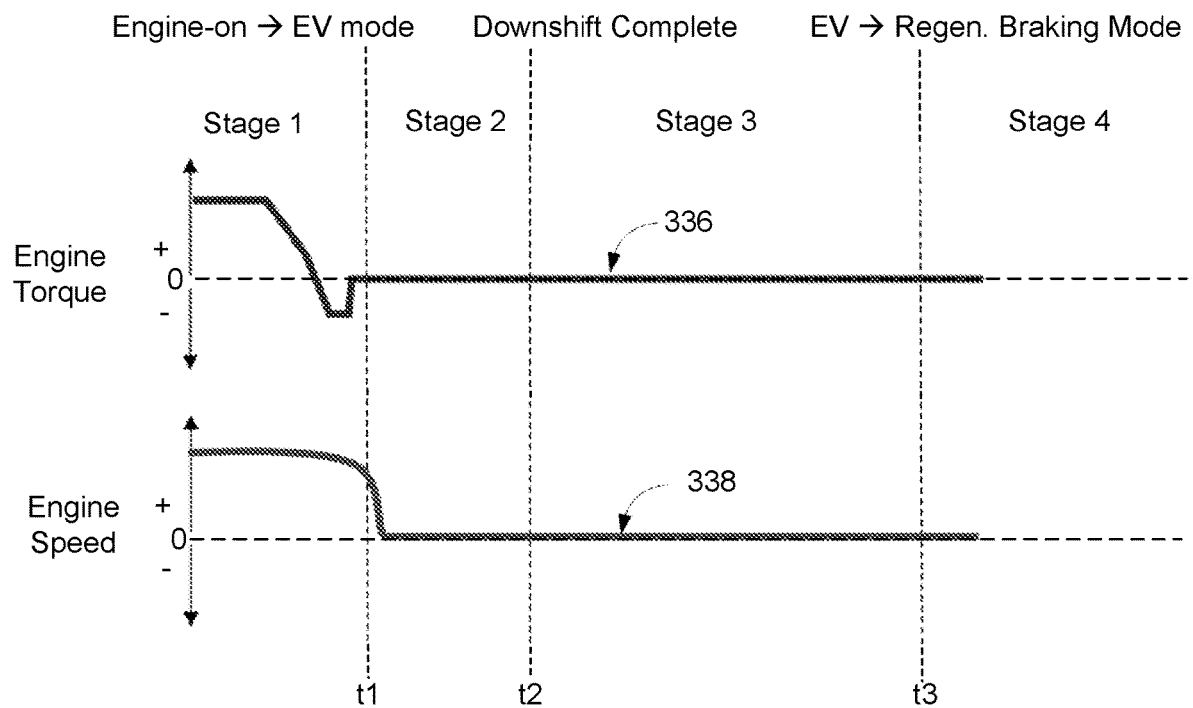
FIG. 3B is a continuation of the time chart of FIG. 3A.

FIG. 3A is a time chart illustrating an example of motor torque control in accordance with various embodiments of the present disclosure. FIG. 3B is a continuation of the time chart of FIG. 3B. As illustrated in FIG. 3A, during a first stage of operation referred to herein as "Stage 1," a hybrid vehicle, e.g., hybrid vehicle 10 of FIG. 1A, may begin coasting. That is, a driver of hybrid vehicle 10 may let up on the accelerator pedal such that the acceleration operation amount $A_{CC}$ falls to zero as illustrated by line 300. The driver may also let up on the brakes, or in this case, choose not to apply the brakes such that the brake operation amount B is also at zero as illustrated by line 302. With the engine 14 still operating in Stage 1, hybrid vehicle 10 decelerates at some deceleration rate, and the driver experiences a feeling of deceleration in accordance with the driver's expectations, i.e., that provided by conventional engine braking. Here, motor 12 (if operating) and turbine 16B speed begin to slow down (as evidenced by solid line 310). Motor torque is zero (until engine 14 turns off) (shown by solid line 613, dashed line 318, and dotted line 320), and torque at wheels 34 drops (evidenced by solid line 324), going negative, to decelerate hybrid vehicle 10. During the beginning of deceleration, as illustrated in FIG. 3, vehicle speed may not yet begin to slow, or is still imperceptible (evidenced by solid line 330). FIG. 3B further illustrates engine torque (line 336) and engine speed (line 338) during Stage 1, where engine 14 is turned off at time, t1, so that hybrid vehicle 10 can go into EV travel mode (described below).

Additionally, hybrid vehicle 10 may transition from an engine-on travel mode, e.g., HEV or engine-only travel mode, to an EV travel mode, at some time t1, thereby entering a second stage referred to herein as "Stage 2." During Stage 2, engine 14 is stopped and only motor 12 is operating and generating negative motor torque. Motor 12 and turbine 16B speed continue to slow, while motor torque and torque at wheels 34 have dropped to a value that would keep the deceleration feeling consistent with the engine 14 connected in fuel-cut mode. Vehicle speed begins to drop somewhat more significantly.

When traveling at relatively higher speeds, and hybrid vehicle 10 is operating in an EV travel mode, the amount of deceleration felt by the driver can be larger than anticipated due to hybrid vehicle 10 downshifting and causing the torque to multiply because of the larger gear ratio. This is exacerbated when downshifting is performed, e.g., at time t1, in order to optimize motor speed prior to entering a regenerative braking mode at time t3 that can continue into a fourth stage, referred to herein as "Stage 4." As previously discussed, motor speed can be increased (as evidenced by dashed line 312) by downshifting (as illustrated by dashed line 306). However, the amount of negative motor torque is multiplied by a larger torque multiplication factor at the automatic transmission 18 by virtue of being in the lower gear. That is, an even greater amount of (unexpected) deceleration can be experienced by the driver. For example, as opposed to remaining in the same/current gear (as illustrated by solid line 304), automatic transmission 18 downshifts (as illustrated by dashed line 306). The increase in deceleration can be seen by dashed line 326, as it deviates from solid line 324 (indicative of the torque at wheels 34 had automatic transmission 18 remained in the previous, current gear).

For example, if the current gear prior to downshifting is the $6^{th}$ gear, negative motor torque generated at motor 12 is −50 Nm, and the torque multiplication factor at that gear ratio is 1.0 and the differential gear ratio is 1.0, torque at wheels 34 remains at −50 Nm. If the downshift occurs, e.g., from $6^{th}$ gear to $3^{rd}$ gear, for example, the desired increase in motor 12/turbine 16B speed is achieved, e.g., from 1000 rpm to 1500 rpm. However, the torque multiplication factor in $3^{rd}$ gear may be 1.5. Without a reduction in negative motor torque, the same negative motor torque multiplied by a factor of 1.5 results in −75 Nm of torque at wheels 34, i.e., the undesired increase in rate of deceleration (evidenced by dashed line 332 deviating from solid line 330).

To counteract this effect while still leveraging the increased motor 12/turbine 16B speed, the amount of negative motor torque produced by motor 12 can be reduced so that the torque at wheels 34 can be matched to the torque at the wheels had the downshift not occurred. This may begin during Stage 2 (as evidenced by dotted line 320) as time may be needed to complete the downshift, e.g., from $6^{th}$ gear to $3^{rd}$ gear following the previous example. That is, the negative motor torque is brought closer to zero. By time t2, when the downshift is complete, the amount of negative motor torque previously generated by motor 12 has been reduced to the desired level. That is, the increase in amount of negative torque at wheels 34 (evidenced by area 322A) can be offset (evidenced by area 322B) by the reduction in negative motor torque. Thus, as shown in FIG. 3A, reducing negative motor torque in accordance with various embodiments results in torque at wheels 34 (evidenced by dotted line 328) matches the torque at wheels 34 had the downshift not occurred (evidenced by solid line 324). The rate of deceleration in terms of vehicle speed (illustrated by dotted line 334) remains consistent with the rate of deceleration had the downshift not occurred (illustrated by solid line 330).

Following the above example, the reduction in negative motor torque generated by motor 12 can raise the negative motor torque from −50 Nm to approximately −33.33 Nm. Accordingly, with a torque multiplication factor of 1.5 in $3^{rd}$ gear, the resulting torque at wheels 34 is approximately −50 Nm (−49.994 Nm to be exact) which essentially equals the torque at wheels 34 had the downshift not occurred.

Figure 4:
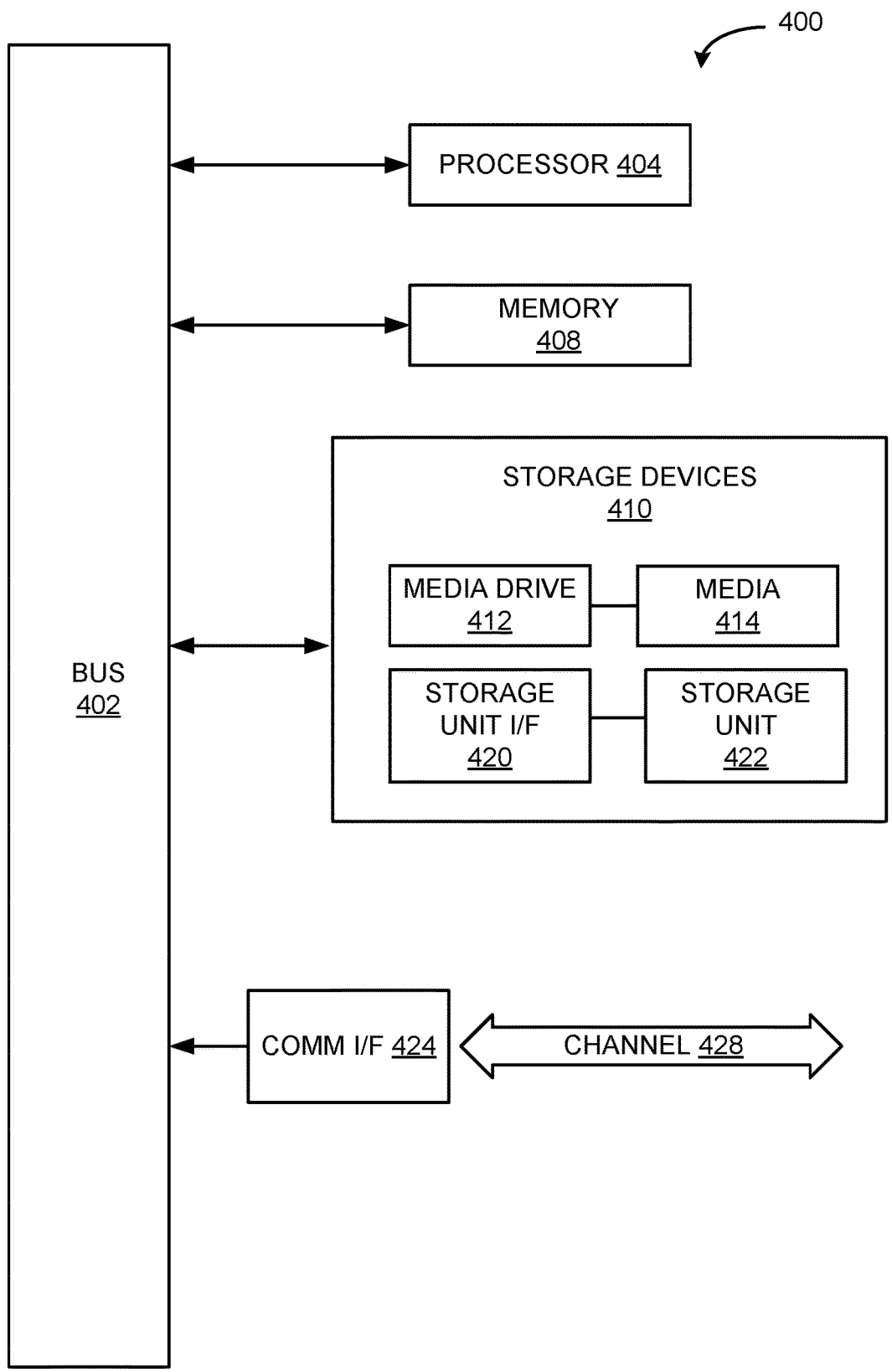
FIG. 4 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within computer processing units or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, electronic devices that might include some form of processing capability.

Computing component 400 might include, for example, one or more processors, controllers, control components, or other processing devices. This can include a processor, and/or any one or more of the components making up electronic control device 100 and/or its component parts, hydraulic control circuit 40, or other components or elements of vehicle, e.g., signal sensors, etc. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    determining a vehicle is experiencing an engine-on, coast condition by determining whether an amount of accelerator operation is zero and determining whether an amount of brake operation is zero;
    transitioning to a motor-only mode in which negative motor torque is generated, and determining a rate of deceleration in a current gear by calculating torque at one or more wheels of the vehicle based upon a first torque multiplication factor based upon a gear ratio of a transmission effectuating a downshifting associated with the current gear applied to the negative motor torque;
    performing the downshifting from the current gear to a lower gear; and
    decreasing the negative motor torque to a torque level resulting in a rate of deceleration matching the determined rate of deceleration at the previously current gear.

2. The method of claim 1, wherein the vehicle comprises a parallel hybrid electric vehicle comprising at least one electric motor operatively connected in parallel with an internal combustion engine in a power transmission path of the parallel hybrid electric vehicle.

3. The method of claim 2, further comprising disconnecting the internal combustion engine from the power transmission path just prior to or upon the transition to the motor-only mode.

4. The method of claim 2, wherein the engine-on coast condition comprises a hybrid electric vehicle mode in which the electric motor and the engine operate simultaneously to provide drive power to the vehicle.

5. The method of claim 1, further comprising calculating the torque level to which the negative motor torque is reduced based upon a second torque multiplication factor of the transmission associated with the lower gear.

6. The method of claim 5, wherein an amount of torque multiplication due to the first torque multiplication factor is smaller than an amount of torque multiplication due to the second torque multiplication factor.

7. The method of claim 1, further comprising determining the lower gear for the downshifting based upon a speed of rotation of an electric motor of the vehicle at which electric motor loss and inverter loss is minimized in anticipation of the vehicle initiating a regenerative braking mode of operation.

8. A hybrid electric vehicle, comprising:
a power transmission path comprising:
an internal combustion engine;
an electric motor operatively connected in parallel to the internal combustion engine; and
a torque converter converting power generated from at least one of the internal combustion engine and the electric motor, and delivering the power to an automatic transmission driving one or more wheels of the hybrid vehicle; and
an electronic control unit adapted to adjust negative motor torque generated by the electric motor at a current gear resulting from the automatic transmission downshifting from a previous gear such that a rate of deceleration in the current gear matches a rate of deceleration in the previous gear, an amount by which the negative motor torque is adjusted being determined by determining an amount of negative motor torque that when multiplied by a torque multiplication factor of the automatic transmission associated with the current gear matches predicted torque at the one or more wheels in the previous gear, the predicted torque being determined at the one or more wheels by multiplying the negative motor torque prior to adjustment with the torque multiplication factor of the automatic transmission associated with the previous gear;
control the internal combustion engine by stopping operation of the internal combustion engine prior to the automatic transmission downshifting upon detecting an engine-on, coasting condition by receiving one or more sensor signals indicating that an accelerator and brakes of the hybrid electric vehicle are not being operated by a driver of the hybrid electric vehicle.

9. The hybrid electric vehicle of claim 8, wherein the electronic control unit further controls the internal combustion engine connecting and disconnecting clutch to disconnect the internal combustion engine from the power transmission path upon detecting the engine-on, coasting condition.

10. The hybrid electric vehicle of claim 8, wherein the torque multiplication factor associated with the current gear is greater than the torque multiplication factor associated with the previous gear.

11. The hybrid electric vehicle of claim 8, wherein the electronic control unit selects the current gear based upon a speed of rotation of the electric motor at the current gear that minimizes electric motor loss and inverter loss in anticipation of the hybrid electric vehicle entering a regenerative braking mode of operation.

12. The hybrid electric vehicle of claim 11, wherein the speed of rotation of the electric motor is between approximately 1500 rpm and approximately 3000 rpm.

* * * * *